Dec. 15, 1953   P. P. SHERRY ET AL   2,662,373
COMBINED WATER COOLED ROTARY GAS
TURBINE AND COMBUSTION CHAMBER
Filed Nov. 23, 1951   2 Sheets-Sheet 2
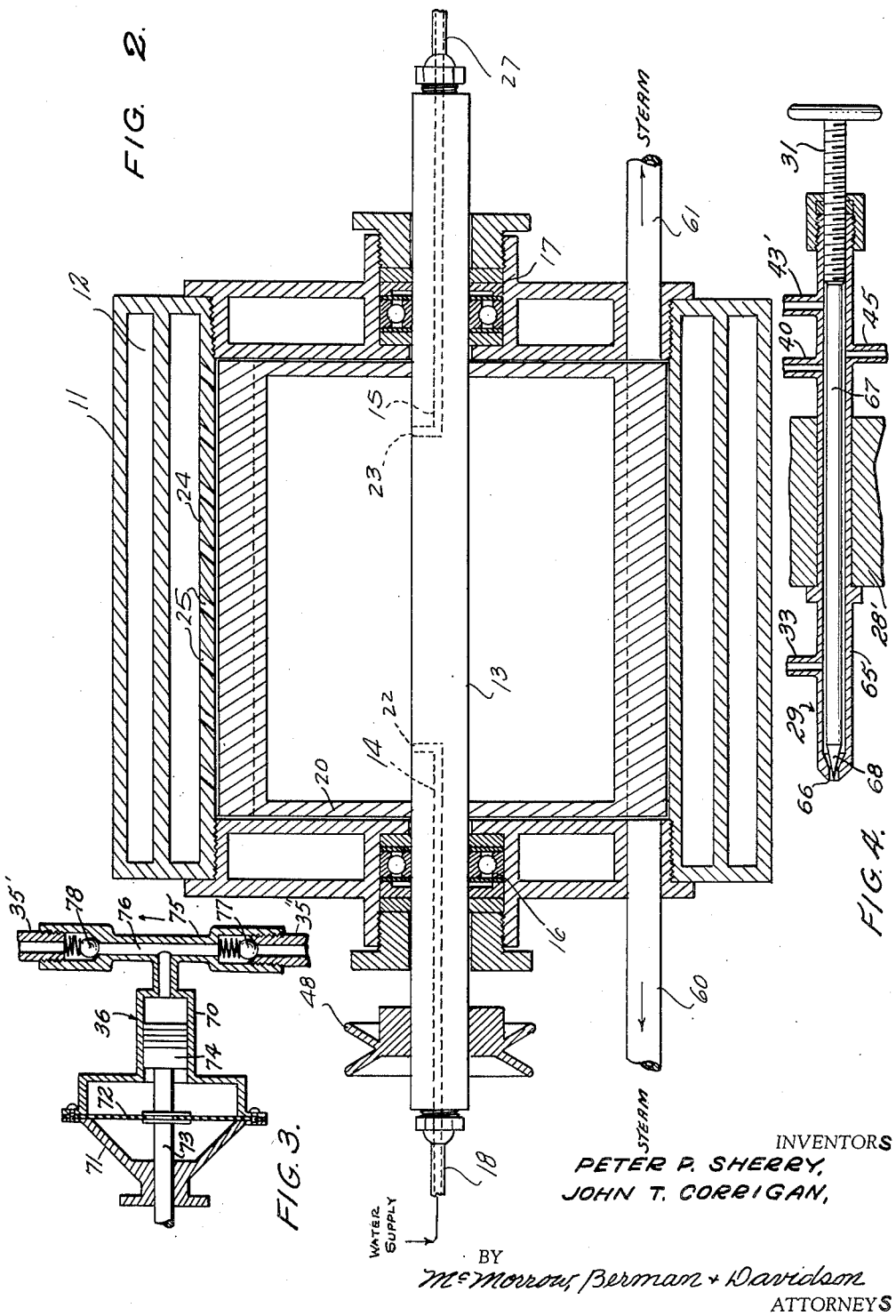
INVENTORS
PETER P. SHERRY,
JOHN T. CORRIGAN,
BY
McMorrow, Berman + Davidson
ATTORNEYS

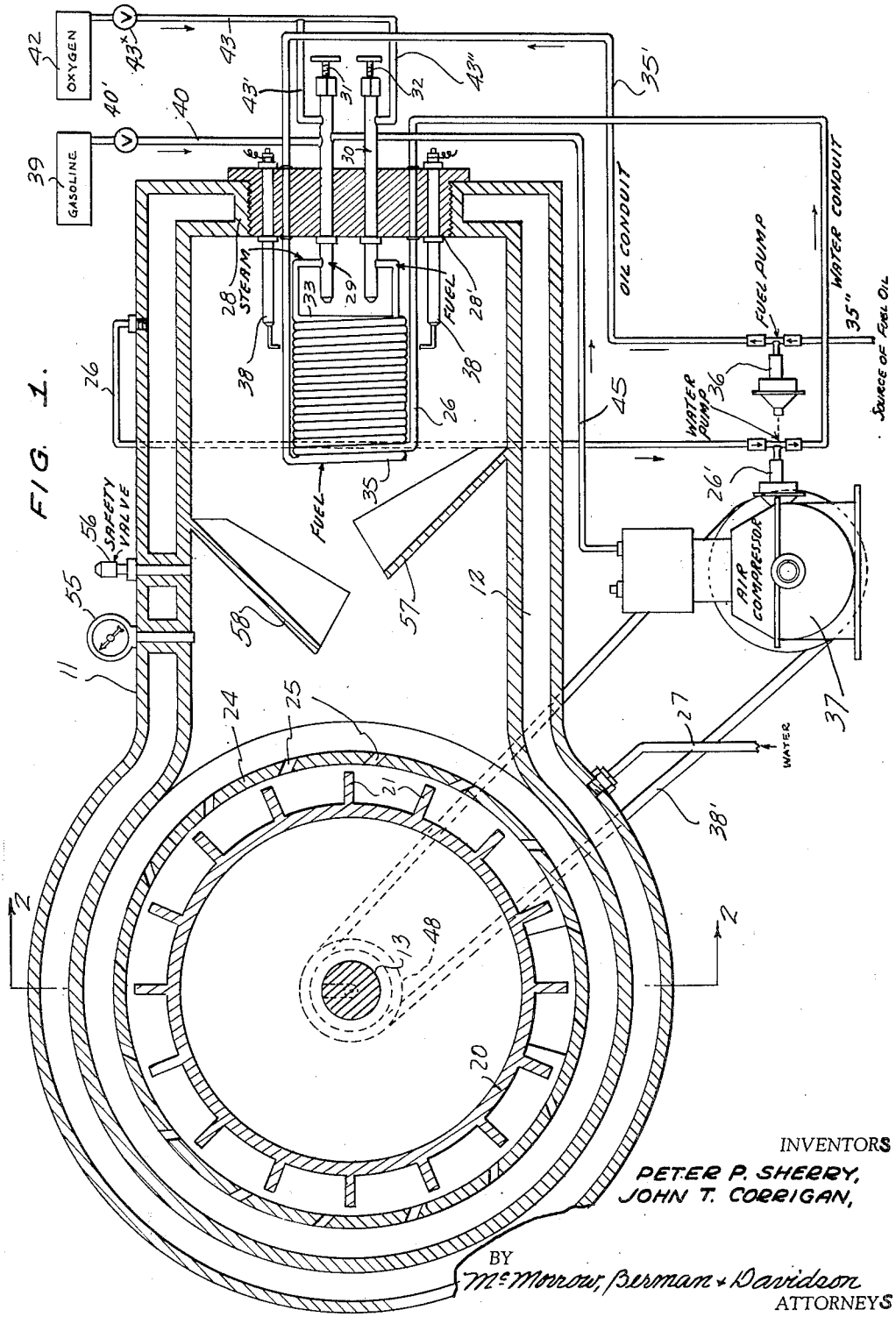

Patented Dec. 15, 1953

2,662,373

UNITED STATES PATENT OFFICE 2,662,373

COMBINED WATER COOLED ROTARY GAS TURBINE AND COMBUSTION CHAMBER

Peter P. Sherry and John T. Corrigan,
Walla Walla, Wash.

Application November 23, 1951, Serial No. 257,853

2 Claims. (Cl. 60—39.55)

This invention relates to power plants, and more particularly to a water cooled chemical turbine.

A main object of the invention is to provide a novel and improved rotary combustion engine of the turbine type, said engine being simple in construction, involving relatively few parts, and having high efficiency.

A further object of the invention is to provide an improved chemical turbine which is relatively inexpensive to construct, which is light in weight, which is compact in size, and which has high power capacity while being very economical in fuel consumption.

Further objects and advantages of the invention will become apparent from the following description and claims, and from the accompanying drawings, wherein:

Figure 1 is a longitudinal vertical cross sectional view taken through the housing of an improved rotary combustion engine according to the present invention, and showing schematically the associated elements of the system connected to the housing;

Figure 2 is a transverse vertical cross sectional view taken on the line 2—2 of Figure 1;

Figure 3 is an enlarged sectional view of the fuel pump;

Figure 4 is an enlarged sectional view of the steam nozzle.

Referring to the drawings, the improved engine comprises a housing 11 which is formed with a water jacket 12 substantially surrounding the entire interior of the housing. As shown in Figure 1, one end portion of the housing is generally circular in shape and has journaled axially therein a shaft 13. The shaft 13, as shown in Figure 2, has respective bores 14 and 15 at its opposite end portions, the intermediate portion of the shaft being solid, and said opposite end portions being rotatably mounted on respective sealed bearings 16 and 17 provided on the opposite sides of the housing 11. As shown in Figure 2, the bearings 16 and 17 include suitable stuffing boxes of conventional construction to provide liquid tight seals for the shaft 13.

Communicating with the bore 14 and rotatably connected to shaft 13 is a conduit 18 connected to a suitable water supply, and rotatably connected to shaft 13 and communicating with bore 15 is a conduit 27 leading to the lower portion of the water jacket 12, as shown in Figure 1. Secured on the intermediate portion of the shaft 13 is a hollow rotor 20, said rotor having the turbine blades 21, as shown in Figure 1. Bore 14 communicates with the interior of rotor 20 by a port 22, allowing water to enter said rotor through said port, said port 22 being located adjacent one end of the cavity in the rotor. Adjacent the other end of the cavity in the rotor, as shown in Figure 2, is another port 23 communicating with the bore 15, allowing the water to discharge from the rotor.

Mounted rigidly in the housing is a cylindrical casing 24 formed with respective rows of inclined nozzle apertures 25 directed toward the respective turbine blades 21, as shown in Figure 1. As further shown in Figure 1, the top portion of the water jacket 12 has connected thereto a water outlet conduit 26, and as above explained, the lower portion of the water jacket is connected by a conduit 27 to the outlet passage 15 of shaft 13. In view of the above connections, heated water may flow from the jacket 12 through the outlet conduit 26 for a purpose presently to be described.

Threadedly engaged in the end wall 28 of the housing 11 is a screw plug 28', and mounted in said plug are the respective inwardly directed nozzles 29 and 30, said nozzles being directed toward the casing 24. The nozzles 29 and 30 are provided with the respective external orifice-regulating means 31 and 32. Connected to the nozzle 29 is one end of a coiled conduit 33 whose other end is connected to the water conduit 26. Wound coaxially with the coiled conduit 33 is another coiled conduit 35 having one end connected to the nozzle 30 and having its other end connected through a conduit 35' to a pump 36, the pump being connected by a conduit 35'' to a source of fuel oil, such as diesel oil, or the like. Pump 36 is driven by a suitable mechanical coupling to the shaft of a compressor 37 which in turn is driven from a pulley 48 secured on the engine shaft 13, as by a belt drive including the belt 38', as shown in Figure 1. Driven simultaneously by this mechanism is another pump 26' which is connected in the water conduit 26 to develop injection pressure in the water flowing to coil 33.

Designated at 38, 38 are respective ignition devices, such as spark plugs which are mounted on the screw plug 28' and are arranged with their ignition gaps disposed forwardly adjacent the orifices of the nozzles 29 and 30. The spark plugs 38, 38 are energized from any suitable ignition system of conventional construction, forming no part of the present invention.

Designated at 39 is a reservoir containing combustible liquid fuel, such as gasoline or the like, which is connected by a conduit 40 to the nozzle 29. The conduit 40 is provided with a valve 40'. Designated at 42 is a tank containing oxygen which is connected by a conduit 43 and respective branch conduits 43', 43'' to the rear portions of the nozzles 29 and 30. Designated at 45 is a conduit connecting the outlet port of the air compressor 37 to the intermediate portion of nozzle 29.

It is to be noted that the nozzles 29 and 30 are of the same structure, and hence, the specific structure of only nozzle 29 will be described. By reference to Figure 4 it will be apparent that the nozzle 29 comprises a tube 65 having a centrally disposed aperture 66 extending through one end thereof. Operatively connected to the tube 65 is the orifice regulating means 31, such means embodying a rod 67 positioned within and spaced from the tube 65 and connected adjacent one end to the other end of the tube for axial longitudinal back and forth movement. The other end of the rod is pointed as indicated by the numeral 68, the pointed end being movable into and out of seating engagement with respect to the aperture 66 in response to longitudinal back and forth movement of the rod. The coiled conduit 33, the conduits 40 and 45, and the branch conduit 43' are all connected to the tube 65.

It will be apparent that the conduit 45 provides a desired amount of air in the nozzle 29, said air being under pressure and mixing with the gasoline from tank 39 to provide a combustible mixture. The oxygen tank 42 provides a desired amount of additional oxygen in the combustible mixture of gas and air, the proportion of oxygen being controllable by a valve 43' in the conduit 43. The pumps 36 and 26' are identical in structure, and hence, the specific structure of only the fuel pump 36 will be described. The fuel pump 36, Figure 4, comprises a cylinder 70 which is connected at one end to a housing 71 in which is mounted a diaphragm 72, the diaphragm being connected to a reciprocable piston rod 73 extending axially through the housing and into the cylinder 70. A piston 74 is secured to the end of the rod 73 within the cylinder 70. The other end of the cylinder 70 is connected in communication with the valve housing 75 which has a passage 76 extending longitudinally therethrough substantially perpendicular to the cylinder 70. Ball check valves 77 and 78 are provided in the passage 75, the valve 77 constituting an inlet valve and the valve 78 constituting an outlet valve. The inlet end of the passage 76 is connected to the conduit 35'' which is connected to a source of fuel oil and the outlet end of the passage is connected to the conduit 35'.

Connected to the intermediate portion of the housing 11 is a pressure gauge 55, and similarly connected to the interior of said housing at its intermediate portion is a safety valve 56. Secured in the intermediate portion of the housing, between the nozzles 29 and 30 and the casing 24 are the oppositely mounted, oppositely inclined baffle plates 57 and 58.

In operation of the device, the combustible mixture of gasoline and oxygen, which may include a desired amount of air, is first admitted into the nozzle 29 and is ignited by means of the spark plugs 38, 38. The flame from the end of nozzle 29 extends inside the coiled conduits 33 and 35, whereby said conduits are heated by the flame. The valve associated with the water pump 26 is opened, allowing water to enter the coil 33 and flow into the nozzle 29 and to be discharged from the end of said nozzle in the form of a substantially vaporized spray. At the same time the valve associated with the fuel pump 36 is opened, allowing fuel oil to flow through conduit 35' into coil 35, and thence into nozzle 30 from the end of which the fuel is discharged in the form of a substantially vaporized spray mixed with oxygen from the oxygen tank 42. The fuel oil mixture is ignited in the combustion space between the spark plugs 38, 38. At the same time the water spray entering said space is vaporized and takes the form of steam. The ignition of the fuel oil provides an elevated temperature in said space, causing the steam to be superheated to high pressure. After the combustion space has been elevated to its working temperature and the fuel oil can be ignited, the supply of gasoline from the tank 39 may be shut off, allowing the machine to operate thereafter from the fuel oil source.

It will be noted that the water heated in the coiled conduit 33 may be raised to such a high temperature by the combustion of the fuel that the water will be substantially in the form of steam when it leaves the nozzle 29. This steam is superheated by the combustion of the fuel oil from the nozzle 30, so that the steam moving toward the casing 24 is at a substantial pressure and temperature. The superheated steam passes through the nozzle apertures 25 of casing 24 and engages the turbine blades 21, causing the rotor 20 to be driven at a high speed.

It will be noted that a substantial amount of heat is reclaimed in the water jacket 12 and in the hollow rotor 20, the heat being returned to the system through the water conduit 28, the coil 33 and the nozzle 29. The fuel consumption of the power plant is thus relatively low, and the power capacity of the plant is relatively high for a given size and weight of installation. The rate of supply of the fuel through the nozzle 30 may be regulated by means of the manual valve 32, and similarly the supply of steam through the nozzle 29 may be regulated by the manual valve 31. The system, as illustrated in the drawings, is substantially self-contained, and may be readily used in the field or on vehicles.

Since the steam is superheated by the combustion of the fuel oil from the nozzle 30, the superheated steam reaching the turbine casing 24 is at a very high temperature and pressure, whereby a substantial amount of power may be transmitted thereby to the rotor 20 as the superheated steam passes through the nozzle apertures 25 and impinges on the turbine blades 21. The degree of superheat may, of course, be regulated by means of the nozzle control valve 32 which controls the rate at which the diesel fuel is supplied, as well as by the nozzle control valve 31 which determines the rate at which the steam is furnished to the combustion area of the engine.

The baffle plate 57, being located adjacent to the combustion space, is heated to a relatively high temperature, and the steam from said space impinges on the plate 57 and obtains a substantial amount of heat therefrom, elevating the temperature and pressure of the steam. The same action occurs to a somewhat lesser degree when the steam engages the baffle plate 58. Therefore, the steam is superheated both by the direct action of the burning fuel and by the transmission of heat thereto from the inclined baffle plates 57 and 58. Obviously, any desired number of baffle plates may be employed.

As shown in Figure 2, the exhaust steam may leave the housing 11 through respective exhaust conduits 60 and 61 provided at the ends of the housing adjacent opposite ends of a peripheral portion of the rotor 20. The exhaust steam may be employed in any desired manner, such as for heating, processing, or the like.

While a specific embodiment of an improved chemical turbine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A rotary combustion engine comprising a housing, a turbine rotor rotatably mounted in said housing, a casing rigidly mounted in said housing around the rotor and formed with nozzle apertures directed toward the periphery of said rotor, a steam exhaust conduit communicating with the interior of said casing adjacent the peripheral portion of said rotor, a source of liquid fuel, a fuel preheating coil in said housing, a conduit connecting said source to one end of said preheating coil, the other end of said preheating coil being open and terminating in said housing, an oxygen source connected to said housing, ignition means in said housing adjacent the open end of said fuel preheating coil, a water jacket surrounding said housing, an additional preheating coil connected to said water jacket, an injection nozzle connected to said additional preheating coil and opening adjacent said ignition means, whereby preheated water is injected into the housing and is converted into steam at high temperature and pressure by the combustion of the fuel, said steam passing through said nozzle apertures and driving said rotor, a second source of fuel connected to said injection nozzle, and an air compressor driven by said turbine rotor and connected to the open end of said preheating coil, whereby to provide air for the combustion of the fuel.

2. A rotary combustion engine comprising a housing, a turbine rotor rotatably mounted in said housing, a casing rigidly mounted in said housing around the rotor and formed with nozzle apertures directed toward the periphery of said rotor, a steam exhaust conduit communicating with the interior of said casing adjacent the peripheral portion of said rotor, a source of liquid fuel, a fuel preheating coil in said housing, a conduit connecting said source to one end of said preheating coil, the other end of said preheating coil being open and terminating in said housing, an oxygen source connected to said housing, ignition means in said housing adjacent the open end of said fuel preheating coil, a water jacket surrounding said housing, an additional preheating coil connected to said water jacket, an injection nozzle connected to said additional preheating coil and opening adjacent said ignition means, whereby preheated water is injected into the housing and is converted into steam at high temperature and pressure by the combustion of the fuel, said steam passing through said nozzle apertures and driving said rotor, a source of combustible liquid fuel connected to said injection nozzle, a plurality of spaced oppositely inclined baffle plates mounted in said housing between said ignition means and said casing, and an air compressor driven by said turbine rotor and connected to the open end of said preheating coil.

PETER P. SHERRY.
JOHN T. CORRIGAN.

References Cited in the file of this patent

UNITED STATES PATENTS

| Number | Name | Date |
|--------|------|------|
| 864,821 | Zoelly | Sept. 3, 1907 |
| 987,158 | Neilson | Mar. 21, 1911 |
| 1,154,131 | Sands | Sept. 21, 1915 |
| 1,988,456 | Lysholm | Jan. 22, 1935 |
| 2,568,662 | Sanborn | Sept. 18, 1951 |
| 2,592,227 | Yeomans | Apr. 8, 1952 |